(12) United States Patent
Ji et al.

(10) Patent No.: US 11,616,235 B2
(45) Date of Patent: Mar. 28, 2023

(54) FUNCTIONAL LITHIATED AGENT-CONTAINING ADDITIVES IN LI-ION BATTERY ELECTRODES

(71) Applicant: Enevate Corporation, Irvine, CA (US)

(72) Inventors: Liwen Ji, San Diego, CA (US); Younes Ansari, Irvine, CA (US); Benjamin Park, Mission Viejo, CA (US)

(73) Assignee: Enevate Corporation, Irvine, CA (US)

( * ) Notice: Subject to any disclaimer, the term of this patent is extended or adjusted under 35 U.S.C. 154(b) by 260 days.

(21) Appl. No.: 16/860,005

(22) Filed: Apr. 27, 2020

(65) Prior Publication Data

US 2021/0344013 A1    Nov. 4, 2021

(51) Int. Cl.
| | |
|---|---|
| *H01M 10/0525* | (2010.01) |
| *H01M 4/134* | (2010.01) |
| *H01M 4/62* | (2006.01) |
| *H01M 4/131* | (2010.01) |
| *H01M 10/058* | (2010.01) |
| *H01M 4/525* | (2010.01) |
| *H01M 4/38* | (2006.01) |

(52) U.S. Cl.
CPC ............ *H01M 4/62* (2013.01); *H01M 4/131* (2013.01); *H01M 4/134* (2013.01); *H01M 4/386* (2013.01); *H01M 4/525* (2013.01); *H01M 10/058* (2013.01); *H01M 10/0525* (2013.01)

(58) Field of Classification Search
CPC ........ H01M 4/62; H01M 4/131; H01M 4/134; H01M 4/386; H01M 10/0525; H01M 10/058
See application file for complete search history.

(56) References Cited

U.S. PATENT DOCUMENTS

| 5,316,875 A | * | 5/1994 | Murai | ................... | H01M 4/131 429/223 |
| 5,368,957 A | * | 11/1994 | Kozmik | ............... | H01M 10/05 429/231.95 |
| 2011/0177393 A1 | * | 7/2011 | Park | ....................... | H01M 4/38 252/502 |
| 2011/0200883 A1 | * | 8/2011 | Cui | ....................... | H01M 4/134 977/773 |

FOREIGN PATENT DOCUMENTS

| CN | 106848255 | * | 6/2017 |
| JP | 2005197025 | * | 7/2005 |

OTHER PUBLICATIONS

CN 106848255 MT (Year: 2017).*
JP 2005197025 MT (Year: 2005).*

* cited by examiner

*Primary Examiner* — Alexander Usyatinsky

(74) *Attorney, Agent, or Firm* — McAndrews, Held & Malloy, Ltd.

(57) ABSTRACT

Systems and methods for batteries comprising a cathode, an electrolyte, and an anode, wherein one or both electrodes contain a functional lithiated agent-containing additive.

10 Claims, 16 Drawing Sheets

FUNCTIONAL LITHIATED AGENT-CONTAINING ADDITIVES IN LI-ION BATTERY ELECTRODES

TECHNICAL FIELD

Aspects of the present disclosure relate to energy generation and storage. More specifically, certain embodiments of the disclosure relate to a method and system for using functional lithiated agent-containing additives in Li-ion battery electrodes.

BACKGROUND

Conventional approaches for battery electrolytes may be costly, cumbersome, and/or inefficient—e.g., they may be complex and/or time consuming to implement, and may limit battery lifetime.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or method for using functional lithiated agent-containing materials in Li-ion batteries, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

BRIEF DESCRIPTION OF SEVERAL VIEWS OF THE DRAWINGS

FIG. 4A shows a control sample. FIG. 4B shows a 2-Thienyllithium treated cathode.

DETAILED DESCRIPTION

Figure 1:
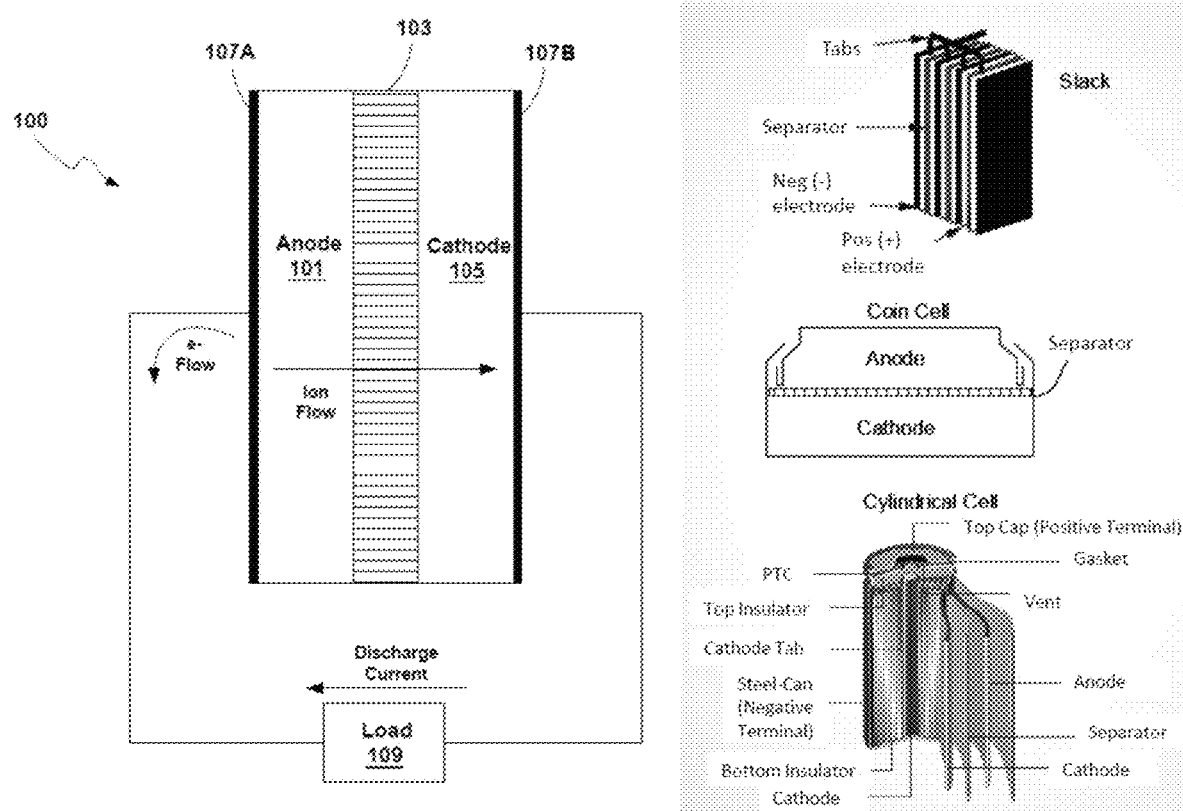
FIG. 1 is a diagram of several batteries, in accordance with an example embodiment of the disclosure.

FIG. 1 is a diagram of a battery, in accordance with an example embodiment of the disclosure. Referring to FIG. 1, there is shown a battery 100 comprising a separator 103 sandwiched between an anode 101 and a cathode 105, with current collectors 107A and 107B. There is also shown a load 109 coupled to the battery 100 illustrating instances when the battery 100 is in discharge mode. In this disclosure, the term "battery" may be used to indicate a single electrochemical cell, a plurality of electrochemical cells formed into a module, and/or a plurality of modules formed into a pack. Furthermore, the cell shown in FIG. 1 is a very simplified example merely to show the principle of operation of a lithium ion cell. Examples of realistic structures are shown to the right in FIG. 1, where stacks of electrodes and separators are utilized, with electrode coatings typically on both sides of the current collectors. The stacks may be formed into different shapes, such as a coin cell, cylindrical cell, or prismatic cell, for example.

The development of portable electronic devices and electrification of transportation drive the need for high performance electrochemical energy storage. Small-scale (<100 Wh) to large-scale (>10 KWh) devices primarily use lithium-ion (Li-ion) batteries over other rechargeable battery chemistries due to their high-performance.

The anode 101 and cathode 105, along with the current collectors 107A and 107B, may comprise the electrodes, which may comprise plates or films within, or containing, an electrolyte material, where the plates may provide a physical barrier for containing the electrolyte as well as a conductive contact to external structures. In other embodiments, the anode/cathode plates are immersed in electrolyte while an outer casing provides electrolyte containment. The anode 101 and cathode are electrically coupled to the current collectors 107A and 107B, which comprise metal or other conductive material for providing electrical contact to the electrodes as well as physical support for the active material in forming electrodes.

The configuration shown in FIG. 1 illustrates the battery 100 in discharge mode, whereas in a charging configuration, the load 107 may be replaced with a charger to reverse the process. In one class of batteries, the separator 103 is generally a film material, made of an electrically insulating polymer, for example, that prevents electrons from flowing from anode 101 to cathode 105, or vice versa, while being porous enough to allow ions to pass through the separator 103. Typically, the separator 103, cathode 105, and anode 101 materials are individually formed into sheets, films, or active material coated foils. Sheets of the cathode, separator and anode are subsequently stacked or rolled with the separator 103 separating the cathode 105 and anode 101 to form the battery 100. In some embodiments, the separator 103 is a sheet and generally utilizes winding methods and stacking in its manufacture. In these methods, the anodes, cathodes, and current collectors (e.g., electrodes) may comprise films.

In an example scenario, the battery 100 may comprise a solid, liquid, or gel electrolyte. The separator 103 preferably does not dissolve in typical battery electrolytes such as compositions that may comprise: Ethylene Carbonate (EC), Fluoroethylene Carbonate (FEC), Di-fluoroethylene carbonate (DiFEC), Propylene Carbonate (PC), Trifluoropropylene carbonate (TFPC), Dimethyl Carbonate (DMC), Ethyl Methyl Carbonate (EMC), Diethyl Carbonate (DEC), etc. with dissolved $LiBF_4$, $LiAsF_6$, $LiPF_6$, Lithium bis(oxalato) borate ($LiB(C_2O_4)_2$; LiBOB), Lithium difluoro(oxalato)borate ($LiBF_2(C_2O_4)$; LiDFOB), Lithium 2-trifluoromethyl-4, 5-dicyanoimidazole ($C_6F_3LiN_4$; LiTDI), Lithium bis (trifluoromethanesulfonyl)imide ($LiC_2F_6NO_4S_2$; LiTFSI), Lithium bis(fluorosulfonyl)imide ($F_2LiNO_4S_2$, LiFSI), $LiPO_2F_2$, $LiSiF_6$, $LiClO_4$, Lithium triflate ($LiCF_3SO_3$), Lithium tetrafluorooxalato phosphate (LTFOP), Lithium pentafluoroethyltrifluoroborate (LiFAB), Lithium bis(2-fluoromalonato)borate (LiBFMB), Lithium 4-pyridyl trimethyl borate (LPTB), Lithium 2-fluorophenol trimethyl borate (LFPTB), Lithium catechol dimethyl borate (LiCDMB), etc. The separator 103 may be wet or soaked with a liquid or gel electrolyte. In addition, in an example embodiment, the separator 103 does not melt below about 100 to 120° C., and exhibits sufficient mechanical properties for battery applications. A battery, in operation, can experience expansion and contraction of the anode and/or the cathode. In an example embodiment, the separator 103 can expand and contract by at least about 5 to 10% without failing, and may also be flexible.

The separator 103 may be sufficiently porous so that ions can pass through the separator once wet with, for example, a liquid or gel electrolyte. Alternatively (or additionally), the separator may absorb the electrolyte through a gelling or other process even without significant porosity. The porosity of the separator 103 is also generally not too porous to allow the anode 101 and cathode 105 to transfer electrons through the separator 103.

The anode 101 and cathode 105 comprise electrodes for the battery 100, providing electrical connections to the device for transfer of electrical charge in charge and discharge states. The anode 101 may comprise silicon, carbon, or combinations of these materials, for example. Typical anode electrodes comprise a carbon material that includes a current collector such as a copper sheet. Carbon is often used because it has excellent electrochemical properties and is also electrically conductive. Anode electrodes currently used in rechargeable lithium-ion cells typically have a specific capacity of approximately 200 milliamp hours per gram. Graphite, the active material used in most lithium ion battery anodes, has a theoretical energy density of 372 milliamp hours per gram (mAh/g). In comparison, silicon has a high theoretical capacity of 4200 mAh/g. In order to increase volumetric and gravimetric energy density of lithium-ion batteries, silicon may be used as the active material for the cathode or anode. Silicon anodes may be formed from silicon composites, with more than 50% silicon, for example.

In an example scenario, the anode 101 and cathode 105 store the ion used for separation of charge, such as lithium. In this example, the electrolyte carries positively charged lithium ions from the anode 101 to the cathode 105 in discharge mode, as shown in FIG. 1 for example, and vice versa through the separator 105 in charge mode. The movement of the lithium ions creates free electrons in the anode 101 which creates a charge at the positive current collector 107B. The electrical current then flows from the current collector through the load 109 to the negative current collector 107A. The separator 103 blocks the flow of electrons inside the battery 100, allows the flow of lithium ions, and prevents direct contact between the electrodes.

While the battery 100 is discharging and providing an electric current, the anode 101 releases lithium ions to the cathode 105 via the separator 103, generating a flow of electrons from one side to the other via the coupled load 109. When the battery is being charged, the opposite happens where lithium ions are released by the cathode 105 and received by the anode 101.

The materials selected for the anode 101 and cathode 105 are important for the reliability and energy density possible for the battery 100. The energy, power, cost, and safety of current Li-ion batteries need to be improved in order to, for example, compete with internal combustion engine (ICE) technology and allow for the widespread adoption of electric vehicles (EVs). High energy density, high power density, and improved safety of lithium-ion batteries are achieved with the development of high-capacity and high-voltage cathodes, high-capacity anodes and functionally non-flammable electrolytes with high voltage stability and interfacial compatibility with electrodes. In addition, materials with low toxicity are beneficial as battery materials to reduce process cost and promote consumer safety.

Li-ion batteries are being intensively pursued in the electric vehicle markets and stationary energy storage devices. To further improve the cell energy density, high-voltage layered transition metal oxide cathodes, examples including, but not limited to, Ni-rich cathodes (such as Lithium Nickel Cobalt Aluminum Oxide ($LiNi_xCo_yAl_zO_2$, x+y+z=1) (NCA) or Lithium Nickel Cobalt Manganese Oxide ($LiNi_aCo_bMn_cO_2$, a+b+c=1) (NCM or NMC)), Li-rich cathodes, or others can be adopted. However, the performance deterioration of full cells, in which these oxides are paired with a Si or graphite anode, increases markedly at potentials exceeding 4.30 V, limiting their wider use as high-energy cathode materials. Although a higher Ni content provides higher specific capacity for Ni-rich NCM or NCA cathodes, this can cause surface instability because the unstable $Ni^{4+}$ increases during the charging process. It can be favorable to convert the unstable $Ni^{4+}$ into the more stable $Ni^{3+}$ or $Ni^{2+}$, as $Ni^{4+}$ triggers severe electrolyte decomposition at the electrode/electrolyte interface, leading to the reduction of $Ni^{4+}$ and the oxidative decomposition of the electrolytes.

Electrolyte decomposition at the electrolyte/electrode interface may cause accumulation of decomposed adducts on the cathode surface. This hinders $Li^+$ migration between the electrolyte and electrode, which in turn may result in fading of the cycling performance. To alleviate this problem, several attempts for improving the cathode surface properties, such as through-surface coating, surface doping, and use of electrolyte additives that effectively mitigate electrolyte decomposition at the interface, have been undertaken.

Most of these attempts are based on the cathode-electrolyte interface (CEI) concept, which does not permit electron-transfer reactions, but allows Li$^+$ migration between the electrode and electrolyte.

Recently, new generations of the layered cathode materials, such as Li[Ni$_x$Co$_y$Mn$_z$]O$_2$ (NCM), or Li[Ni$_x$Co$_y$Al$_z$]O$_2$ (NCA) have been broadly developed and commercialized primarily regarding their higher capacity and voltage. Ni-rich NCMs and particularly NCA (theoretical capacity of 278 mAh/g) may be capable of reaching or approaching the energy density and specific energy of 700 Wh/L and 300 Wh/kg, respectively, at the cell level with paired with high capacity anode, such as Si—C composites. Nevertheless, several concerns, such as unsatisfactory cyclability, rate capability and thermal stability, need to be resolved to make it a feasible and practical choice for commercialization. A number of strategies have been explored to overcome these issues, such as cation doping for stabilizing the cathode material's lattice structure, surface coating for protecting cathode particles from parasitic reactions with the electrolyte components, synthesizing concentration-gradient or core-shell structures with high Ni content core for stabilizing the material's surface chemistry, as well as using electrolyte additives for chemically trapping the released oxygen.

Without negative impacts on the anode, electrolyte, and the battery manufacture procedures or design, adding cathode additives such as functional lithiated agent-containing additives may be considered an efficient, cost-effective and practically feasible strategy to overcome the barriers of layered cathode materials and to finally improve the full cell performance.

As described and illustrated herein, utilizing a functional lithiated agent-containing additive as part of an electrode (cathode, anode or both) can have a positive effect on battery performance. Development of an artificial CEI layer on the surface of cathodes by the use of lithiated agents can enhance the surface stability of cathodes such as Ni-rich NCM or NCA and others. The chemically induced CEI layer can be achieved during the mixing process used to prepare the cathode slurries. This contrasts with the typical coating approaches that require temperatures in excess of several hundred degrees for the coating of inorganic materials onto the surfaces of cathodes. A similar strategy can also be adopted to other types of Li-ion battery cathodes, such as other types of Ni-rich NCM or NCA cathodes, Li-rich, xLi$_2$MnO$_3$.(1−x)LiNi$_a$Co$_b$Mn$_c$O$_2$, Li-rich layered oxides, high-voltage spinel oxides, etc. As also described herein, functional lithiated agent-based materials can function as cathode additives for different types of cathodes (such as Ni-rich NCA or NCM, Li-rich, xLi$_2$MnO$_3$.(1−x)LiNi$_a$Co$_b$Mn$_c$O$_2$, Li-rich layered oxides, high-voltage spinel oxides, etc.) and can also be additives for Si anodes or electrolytes.

For anodes, Si-based materials can provide significant improvement in energy density. However, the large volumetric expansion (>300%) during the Li alloying/de-alloying processes can lead to disintegration of the active material and the loss of electrical conduction paths, thereby reducing the cycling life of the battery. In addition, an unstable solid electrolyte interphase (SEI) layer can develop on the surface of the cycled anodes. As the active material expands and contracts during each charge-discharge cycle, unreacted Si surfaces in the active material can subsequently be exposed to the liquid electrolyte and form thicker SEI layers. This results in an irreversible capacity loss at each cycle due to the reduction at the low potential where the liquid electrolyte reacts with the exposed unreacted surface of the Si in the anode.

Figure 2:
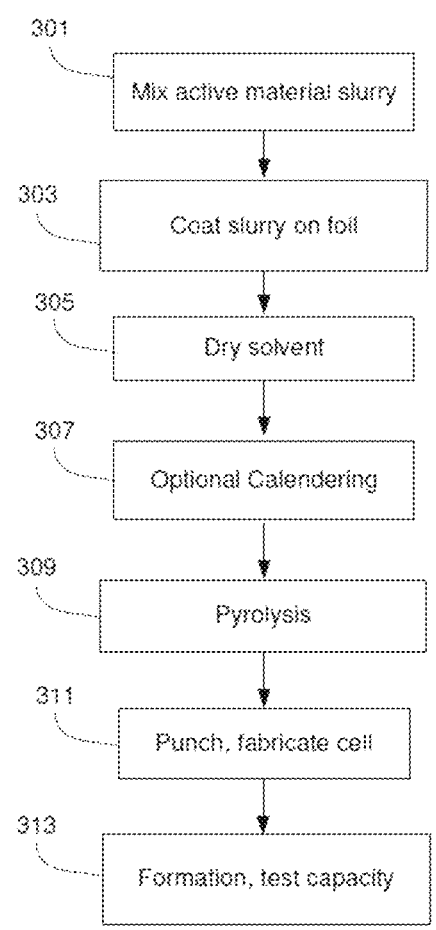
FIG. 2 is a flow diagram of a direct coating process for forming a cell with cathode having a functional lithiated agent-containing additive, in accordance with an example embodiment of the disclosure.

FIG. 2 is a flow diagram of a direct coating process for forming a cell with functional lithiated agent-containing additive cathode, in accordance with an example embodiment of the disclosure. This process comprises physically mixing the active material, functional lithiated agent-containing additive, and binder together, and coating it directly on a current collector. This example process comprises a direct coating process in which an anode slurry is directly coated on a copper foil using a binder such as PVDF, CMC, SBR, Sodium Alginate, PAI, Poly(acrylic acid) (PAA), PI, LA133, polyvinyl alcohol (PVA), polyethylene glycol (PEG), Nafion solution, recently reported electronically conductive polymer binders, and mixtures and combinations thereof. Another example process comprising forming the active material on a substrate and then transferring to the current collector is described with respect to FIG. 3.

In step 201, the raw electrode active material may be mixed using a binder/resin (such as PI, PAI), solvent, and conductive carbon. For example, for the cathode, Super P/VGCF (1:1 by weight), or other types carbon materials, such as graphite, graphene, etc., may be dispersed in binder solution (mixture of NMP and PVDF) for 0.5 to 2 minutes at 1500-2500 rpm. NCA cathode material powder may be added to the mixture along with NMP solvent, then dispersed for another 1-3 minutes at 1500-2500 rpm to achieve a slurry viscosity within 2000-4000 cP (total solid content of about 48%). A functional lithiated agent-containing additive may be mixed in with the slurry at this point, or may be added at a later stage in the process. A similar process may be utilized to mix the active material slurry for the anode.

In step 203, the cathode slurry may be coated on an aluminum foil at a loading of, e.g., 15-35 mg/cm$^2$. Similarly, the anode slurry may be coated on a copper foil at a loading of 3-6 mg/cm$^2$, which may undergo drying in step 205 resulting in less than 13-20% residual solvent content. In another example scenario, a functional lithiated agent-containing additive may be incorporated by dipping the coated foil in a solution or suspension containing the desired functional lithiated agent-containing additive.

In step 207, an optional calendering process may be utilized where a series of hard pressure rollers may be used to finish the film/substrate into a smoother and denser sheet of material.

In step 209, the active material (i.e., electrode coating layer) may be pyrolyzed by heating to 500-1200° C. such that carbon precursors are partially or completely converted into glassy carbon. Pyrolysis can be done either in roll form or after punching in step 211. If done in roll form, the punching is done after the pyrolysis process. The punched electrode may then be sandwiched with a separator and cathode with electrolyte to form a cell. If the functional lithiated agent-containing additive has not been incorporated up to this point, it may be added after pyrolysis in the cell fabrication process as an electrolyte additive, for example. In step 213, the cell may be subjected to a formation process, comprising initial charge and discharge steps to lithiate the anode, with some residual lithium remaining and cell testing to determine performance.

Figure 3:
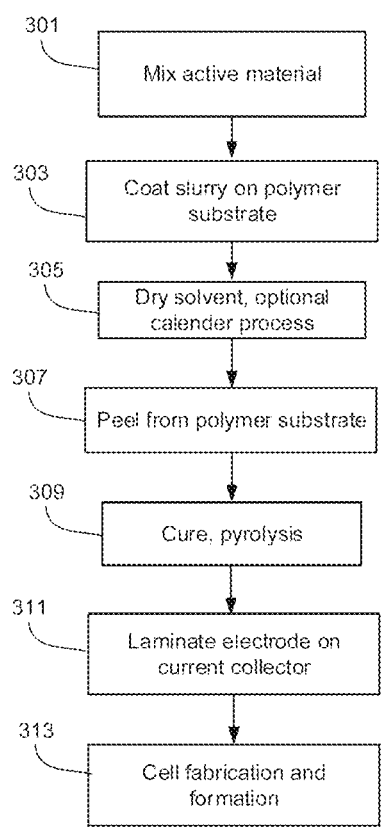
FIG. 3 is a flow diagram of an alternative process for lamination of electrodes, in accordance with an example embodiment of the disclosure.

FIG. 3 is a flow diagram of an alternative process for lamination of electrodes, in accordance with an example embodiment of the disclosure. While the previous process to fabricate composite electrodes (e.g., cathodes, anodes) employs a direct coating process, this process physically mixes the active material, additive, and binder together coupled with peeling and lamination processes.

This process is shown in the flow diagram of FIG. 3, starting with step 301 where the raw electrode active material may be mixed using a binder/resin (such as PI, PAI), solvent, and conductive carbon. For example, for the cathode, Super P/VGCF (1:1 by weight) may be dispersed in binder solution (mixture of NMP and PVDF) for 0.5 to 2 minutes at 1500-2500 rpm. NCM, NCA, Li-rich or other cathode material powder may be added to the mixture along with NMP solvent, then dispersed for another 1-3 minutes at 1500-2500 rpm to achieve a slurry viscosity within 2000-4000 cP (total solid content of about 48%). A functional lithiated agent-containing additive may be mixed in with the slurry at this point, or may be added at a later stage in the process. A similar process may be utilized to mix the active material slurry for the anode.

In step 303, the slurry may be coated on a polymer substrate, such as polyethylene terephthalate (PET), polypropylene (PP), or Mylar. The slurry may be coated on the PET/PP/Mylar film at a loading of 3-6 mg/cm$^2$ (with 13-20% solvent content) for the anode and 15-35 mg/cm$^2$ for the cathode, and then dried to remove a portion of the solvent in step 305. In another example scenario, a functional lithiated agent-containing additive may be incorporated by dipping the green layer coated substrate in a solution or suspension containing the desired functional lithiated agent-containing additive. An optional calendering process may be utilized where a series of hard pressure rollers may be used to finish the film/substrate into a smoothed and denser sheet of material.

In step 307, the green film may then be removed from the PET, where the active material may be peeled off the polymer substrate, the peeling process being optional for a polypropylene (PP) substrate, since PP can leave ~2% char residue upon pyrolysis. The peeling may be followed by a cure and pyrolysis step 309 where the film may be cut into sheets, and vacuum dried using a two-stage process (100-140° C. for 14-16 hours, 200-240° C. for 4-6 hours). The dry film may be thermally treated at 1000-1300° C.

In step 311, the pyrolyzed material may be flat press or roll press laminated on the current collector, where for aluminum foil for the cathode and copper foil for the anode may be coated with polyamide-imide with a nominal loading of 0.35-0.75 mg/cm$^2$ (applied as a 5-7 wt % varnish in NMP, dried 10-20 hour at 100-140° C. under vacuum). In flat press lamination, the active material composite film (i.e., electrode coating layer) may be laminated to the coated aluminum or copper using a heated hydraulic press (30-70 seconds, 250-350° C., and 3000-5000 psi), thereby forming the finished composite electrode. In another embodiment, the pyrolyzed material may be roll-press laminated to the current collector. In yet another example scenario, a functional lithiated agent-containing additive may be incorporated by dipping the coated foil in a solution or suspension containing the desired functional lithiated agent-containing additive.

In step 313, the electrodes may then be sandwiched with a separator and electrolyte to form a cell. If the functional lithiated agent-containing additive has not been incorporated up to this point, it may be added after pyrolysis in the cell fabrication process as an electrolyte additive, for example. The cell may be subjected to a formation process, comprising initial charge and discharge steps to lithiate the anode, with some residual lithium remaining, and testing to assess cell performance.

The present application describes using lithiated agents to treat Si-dominant anodes, and/or various types of cathodes (such as Ni-rich NCM or NCA) to form a stable, artificial SEI or CEI layer on the surface of the cathode and/or Si anode to improve the Li-ion full cell performance. The lithiated agents may be added to the electrolyte as an additive. Batteries having these functional lithiated-agent-containing additives may result in one or more advantages over previous approaches, such as increased cycle life, increased rate capability and power density and/or decreased impedance increase in electrode interfaces.

In some embodiments, in accordance with the disclosure, in a battery with a silicon-based anode, an electrolyte, and a cathode, the cathode comprises an active material and a functional lithiated agent-containing additive. In further embodiments, the cathode active material comprises one or more of: nickel cobalt aluminum oxide (NCA), nickel cobalt manganese oxide (NCM), lithium iron phosphate (LFP), lithium cobalt oxide (LCO), lithium manganese oxide (LMO), Ni-rich layered oxides (LiNi$_{1-x}$M$_x$O$_2$, M=Co, Mn, and Al), Li-rich, xLi$_2$MnO$_3$.(1-x)LiNi$_a$Co$_b$Mn$_c$O$_2$, Li-rich layered oxides (LiNi$_{1+x}$M$_{1-x}$O$_2$, M=Co, Mn, and Ni), or high-voltage spinel oxides (LiNi$_{0.5}$Mn$_{1.5}$O$_4$). In accordance with the disclosure, "active material" may comprise the active material alone, or may encompass an entire electrode coating layer, which includes the active material and other components.

Examples of functional lithiated agent-containing additives include lithiated agents such as organolithium compounds and other compounds containing lithium, further described, but not limited to, the following.

In accordance with the disclosure, lithiated agents are used as additives in treating cathodes, electrolytes, or Si-containing (especially Si dominant) anodes to improve the Si-dominant anode//cathode full cell cycle performance. These lithiated agent-containing additives include, but are not limited to Isobutyllithium; tert-butyllithium; Trimethylsilyl)methyllithium; Lithium bis(diphenylphosphino)methanide; 2-Thienyllithium; 3-Thienyllithium; Lithium;1H-dibenzothiophen-1-ide; lithium;2H-1-benzothiophen-2-ide; Lithium cyclopentadienide; Lithium;5-tert-butylcyclopenta-1,3-diene; Lithium tetramethylcyclopentadienide; Lithium pentamethylcyclopentadienide; Lithium 1H-pyrrol-2-ide; Lithium 1-methyl-1H-pyrrol-2-ide; 2-Furyllithium; (5-Methyl-2-furyl)lithium; Lithium;2H-furan-2-id-5-yl (trimethyl)silane; Lithium,tert-butyl-(3H-inden-3-id-4-yloxy)-diphenylsilane; Phenyllithium; Lithium,tert-butyl 2H-pyrrol-2-ide-1-carboxylate; Lithium,tert-butyl-dimethyl-(2-methylbut-3-yn-2-yloxy)silane; Lithium,tert-butyl-dimethyl-pent-4-ynoxysilane; Lithium,tert-butyl-but-3-ynoxy-dimethylsilane; Lithium,tert-butyl-ethynoxy-dimethylsilane; Lithium phenylacetylide; Lithium (trimethylsilyl)acetylide; Lithium tert-butyl amide; Lithium diisopropylamide (LDA); Lithium tetramethylpiperidide; Lithium dicyclohexylamide; Lithium pyrrol-1-ide; Lithium; 3,3a,4,5-tetrahydro-2H-pyrrolo[2,3-b]pyrrol-1-ide; Lithium, tert-butyl(diphenyl)silanide; Lithium,bis(methylsulfanyl) methyl-tert-butyl-dimethylsilane; Lithium,tert-butyl-phenyl-trimethylsilyloxysilanide; Lithium,tert-butyl-phenyl-trimethylsilylsilanide; Lithium,trimethyl(prop-2-enyl)silane; Lithium trihydro-1-pyrrolidinylborate; Lithium tetramethylborate(1-); Lithium hydrotriisobutylborate(1-); Lithium dimethyldiphenylborate(1-); Lithium triisobutylhydroborate; Lithium bis(tert-butyl)phosphide; Lithium diphenylphosphanide; Lithium tert-butoxide; Lithium tert-butyl peroxide; Lithium aluminium di-n-butylamide; etc. Example functional lithiated agent-containing additive molecular structures are shown below:

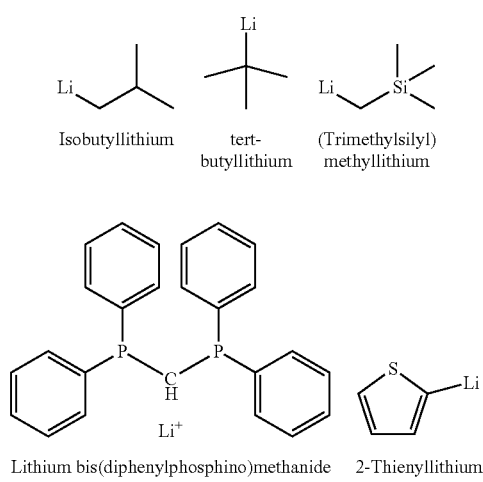

Isobutyllithium    tert-butyllithium    (Trimethylsilyl)methyllithium

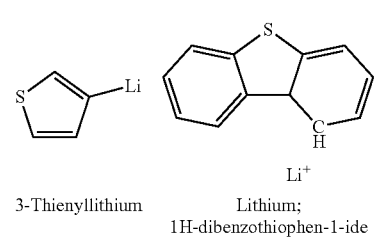

Lithium bis(diphenylphosphino)methanide    2-Thienyllithium

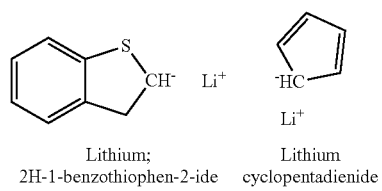

3-Thienyllithium    Lithium; 1H-dibenzothiophen-1-ide

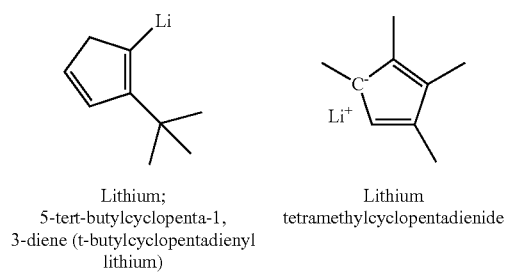

Lithium; 2H-1-benzothiophen-2-ide    Lithium cyclopentadienide

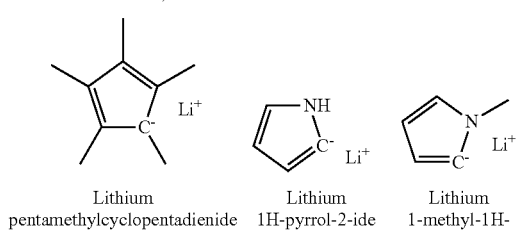

Lithium; 5-tert-butylcyclopenta-1,3-diene (t-butylcyclopentadienyl lithium)    Lithium tetramethylcyclopentadienide

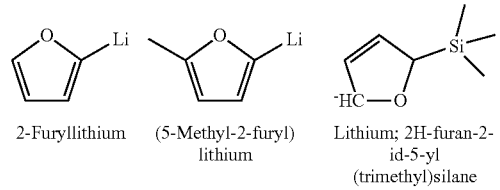

Lithium pentamethylcyclopentadienide    Lithium 1H-pyrrol-2-ide    Lithium 1-methyl-1H-pyrrol-2-ide 2-Furyllithium    (5-Methyl-2-furyl)lithium    Lithium; 2H-furan-2-id-5-yl (trimethyl)silane -continued

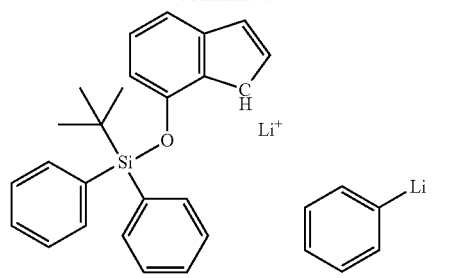

Lithium; tert-butyl-(3H-inden-3-id-4-yloxy)-diphenylsilane (Lithium 7-{[tert-butyl(diphenyl)silyl]oxy}-1H-inden-1-ide)    Phenyllithium

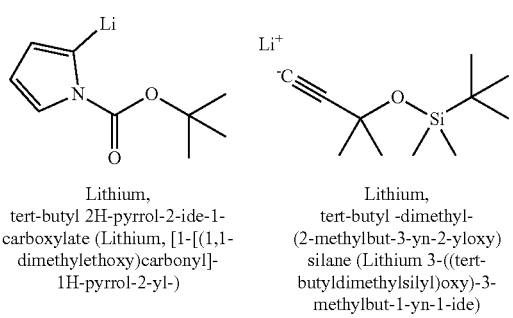

Lithium, tert-butyl 2H-pyrrol-2-ide-1-carboxylate (Lithium, [1-[(1,1-dimethylethoxy)carbonyl]-1H-pyrrol-2-yl-)    Lithium, tert-butyl-dimethyl-(2-methylbut-3-yn-2-yloxy)silane (Lithium 3-((tert-butyldimethylsilyl)oxy)-3-methylbut-1-yn-1-ide)

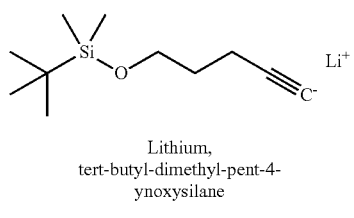

Lithium, tert-butyl-dimethyl-pent-4-ynoxysilane

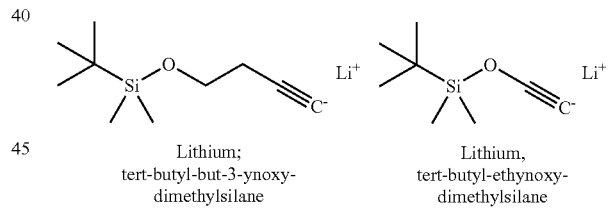

Lithium; tert-butyl-but-3-ynoxy-dimethylsilane    Lithium, tert-butyl-ethynoxy-dimethylsilane

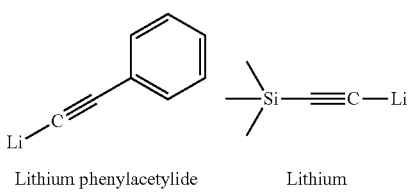

Lithium phenylacetylide    Lithium (trimethylsilyl)acetylide

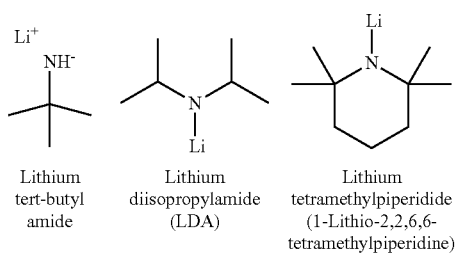

Lithium tert-butyl amide    Lithium diisopropylamide (LDA)    Lithium tetramethylpiperidide (1-Lithio-2,2,6,6-tetramethylpiperidine)

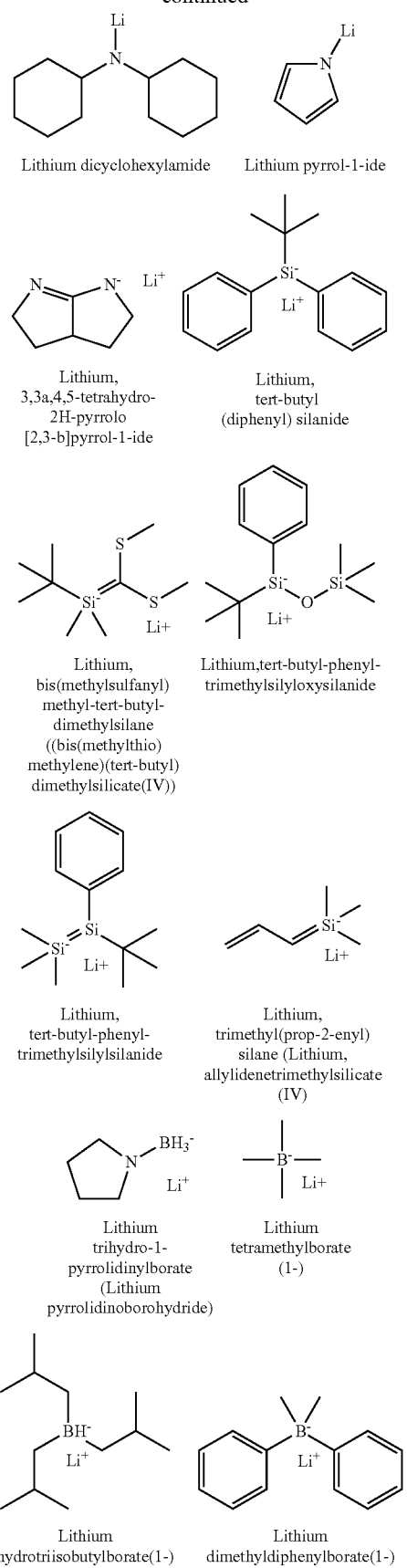
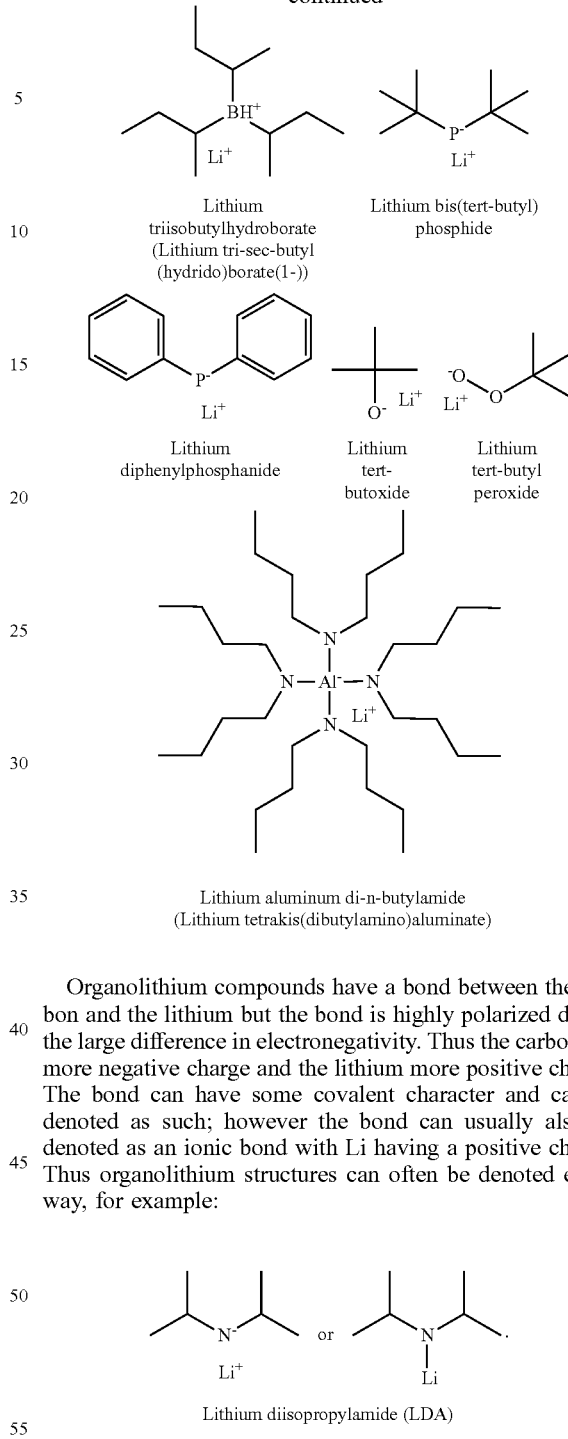

Organolithium compounds have a bond between the carbon and the lithium but the bond is highly polarized due to the large difference in electronegativity. Thus the carbon has more negative charge and the lithium more positive charge. The bond can have some covalent character and can be denoted as such; however the bond can usually also be denoted as an ionic bond with Li having a positive charge. Thus organolithium structures can often be denoted either way, for example:

The ultimate character of the bond depends on factors such as the geometry of the compounds and the substituents.

In one embodiment, the functional lithiated agent-containing additives may be used to improve the Si-containing (especially Si-dominant) anode//cathode full cell cycle performance. In some embodiments, the lithiated agent-containing additive comprises 10% or less by weight of the active material of the anode or cathode. In another embodiment, the lithiated agent-containing additive comprises 5% or less by weight of the active material of the anode or cathode. In further embodiments, the lithiated agent-containing additive comprises 1% or less by weight of the active material. In other embodiments, the lithiated agent-containing additive comprises 0.5% or less by weight of the active material The lithiated agents may be used to treat various cathode types. One cathode type may be NCM (NMC) materials which are Lithium Nickel Manganese Cobalt Oxide materials having the general formula: $LiNi_xMn_yCo_zO_2$. NCM (Ni—Mn—Co) cathodes with different Ni—Mn—Co compositions include but are not limited to 9 0.5 0.5, 811, 622, 532, 442, 333, 433, 111 where the numbers represent the amounts (e.g. percentage) of Ni, Mn and Co respectively; example: $LiNi_{0.5}Mn_{0.3}Co_{0.2}O_2$, Ni:Mn:Co=5:3:2=NCM532. The cathodes can be the Ni-rich NCM materials described above, and also quaternary systems consisting of Ni, Co, Mn and Al together, e.g. $Li[Ni_pCo_qMn_rAl_s]O_2$ (p+q+r+s=1) (NCMA) such as $Li[Ni_{0.89}Co_{0.05}Mn_{0.05}Al_{0.0}]O_2$ etc.; Lithium Nickel Cobalt Aluminium Oxide ($LiNi_aCo_b Al_cO_2$; a+b=c=1, NCA); Lithium Manganese Oxide ($LiMn_2O_4$; LMO); Lithium Cobalt Oxide ($LiCoO_2$; LCO); lithium-rich, $xLi_2MnO_3.(1-x)LiNi_aCo_bMn_cO_2$ cathodes; nickel-rich layered oxides ($LiNi_{1-x}MxO_2$, M=Co, Mn and Al); lithium-rich layered oxides ($LiNi_{1+x} M_{1-x}O_2$, M=Co, Mn and Ni); high-voltage spinel oxides ($LiNi_{0.5}Mn_{1.5}O_4$); or high-voltage polyanionic compounds (phosphates, sulfates, silicates, etc.), etc.

Lithiated agents may also be used to treat various anodes such as anode-based Li-ion batteries, including Si anode-based and directly coated Si-dominant anodes. In a further embodiment, the lithiated agents may be used to treat graphite (carbon) anode-based Li-ion batteries, including hard/soft carbon. In another embodiment, the lithiated agents may be used to treat other anode-based Li-ion batteries. These anodes may be Sn, Sb, P, transition metal oxides, etc. In some embodiments, the anode comprises an active material that comprises between 50% to 95% silicon.

In an additional embodiment, electrodes may be made by adding the lithiated agent into the electrode slurry or depositing on an electrode active material (i.e., electrode coating layer) when creating the additive-containing electrodes. The process may include, for example: (i) adding a certain amount of PVDF binder (in NMP solvent) with SuperP carbon black, and mixing for 2-5 minutes, (ii) then adding electrode (e.g. cathode) active materials (i.e., electrode coating layer), and mixing for another 2-5 minutes, (iii) finally adding the lithiated agent and mixing for another 2-5 minutes. These as-prepared slurries may be used for coating the electrode. The coated cathode can be dried at 120° C. overnight for use as coin full or half cell builds. The cathodes can be Ni-rich NCM, NCA, NCMA, LMO, LCO, lithium rich, $xLi_2MnO_3.(1-x)LiNi_aCo_bMn_cO_2$ cathodes, nickel-rich layered oxides ($LiNi_{1-x}MxO_2$, M=Co, Mn and Al), lithium rich layered oxides ($LiNi_{1+x} M_{1-x}O_2$, M=Co, Mn and Ni), high-voltage spinel oxides ($LiNi_{0.5}Mn_{1.5}O_4$), high-voltage polyanionic compounds (phosphates, sulfates, silicates, etc.), etc. In some embodiments, the above procedure is used to make Si anode-based or directly coated Si-dominant anodes, etc. having a lithiated agent treatment.

A soluble functional lithiated agent-containing additive-based solution may be utilized to directly coat or incorporate the functional lithiated agent-containing additive into the electrode active material (i.e., electrode coating layer) and/or in a slurry. The solvent in the solution may comprise any solvent that is capable of solubilizing or dispersing the soluble functional lithiated agent-containing additives in solution. Some example embodiments of a solvent may include common organic solvents such as, for example, alcohols, ethers, aromatic solvents, $CS_2$, Tetrahydrofuran (THF), cyclohexane (hexanes), toluene or other similar solvents.

In accordance with the disclosure, some example embodiments provide for soluble functional lithiated agent-containing additives that may be incorporated as an electrolyte additive, and for insoluble functional lithiated agent-containing additives that may be used as part of an electrode, or as an insoluble electrolyte additive. In some example embodiments a combination of functional lithiated agent-containing additives can be incorporated including, for example, a combination of soluble and insoluble conductive functional lithiated agent-containing additives. Procedures for incorporating electrolyte additives in a Li-ion battery suitable for use with the present invention include known processes, as well as the processes described in co-pending U.S. patent application Ser. No. 16/430,302 (filed Jun. 3, 2019), Ser. No. 16/430,298 (filed Jun. 3, 2019), and Ser. No. 16/722,746 (filed Dec. 20, 2019), as well as U.S. provisional patent application Ser. Nos.: 62/857,700 (filed Jun. 5, 2019) and 62/857,742 (filed Jun. 5, 2019) each of which is hereby incorporated herein by reference in their entirety.

Example 1: 2-Thienyllithium (Cathode)

Free standing NCA cathode (3 pieces), coated on the surface of Al foil, with a diameter of 12.7 mm and an average loading of about 20-30 mg/cm$^2$ on each side may be immersed in 5 ml of 0.1 M, 0.25M or 0.5M 2-Thienyllithium solution in THF/hexanes for more than 24 hours. The cathodes may be removed from the solution and washed 2-3 times with pure DME to remove the non-reacted 2-Thienyllithium and other contaminants. Then cathodes may be dried and the corresponding full coin-cells assembled with an Si-dominant anode, a liquid electrolyte, and a Celgard 2500 Separator. The coin type full cells may be tested using a 1 C/1 C charge/discharge cycle regime with the working voltage window of 4.2V to 2.5V at room temperature.

Figure 4A:
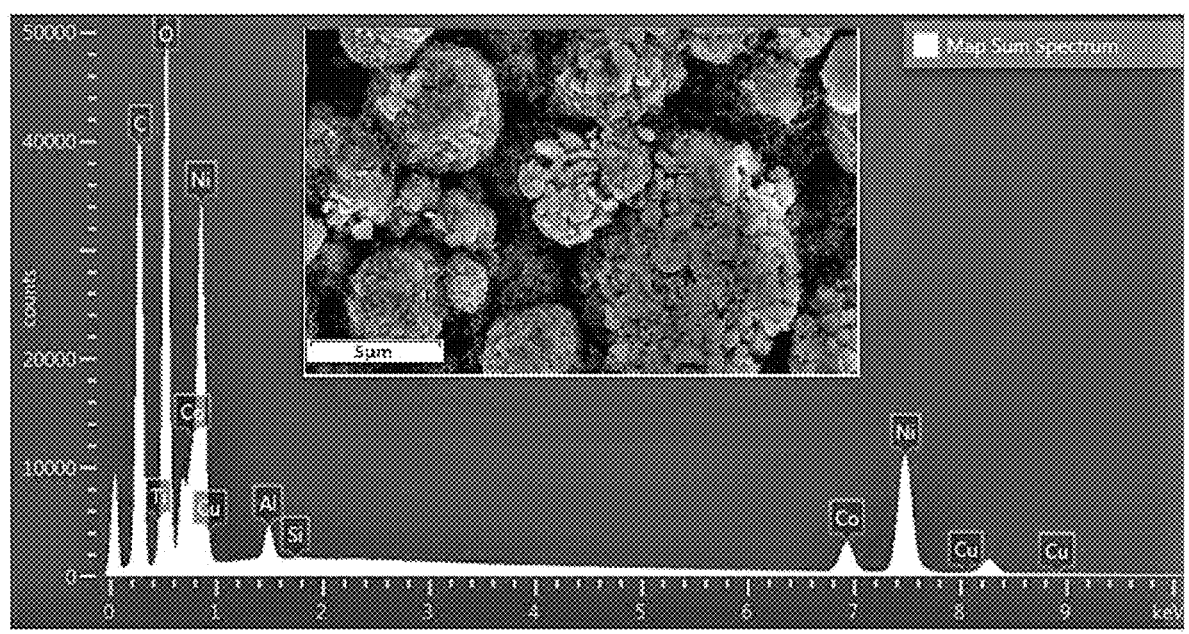
FIGS. 4A and 4B show EDS/SEM signals confirming the successful coating of 2-Thienyllithium on a cathode, in accordance with an example embodiment of the disclosure.
Figure 4B:
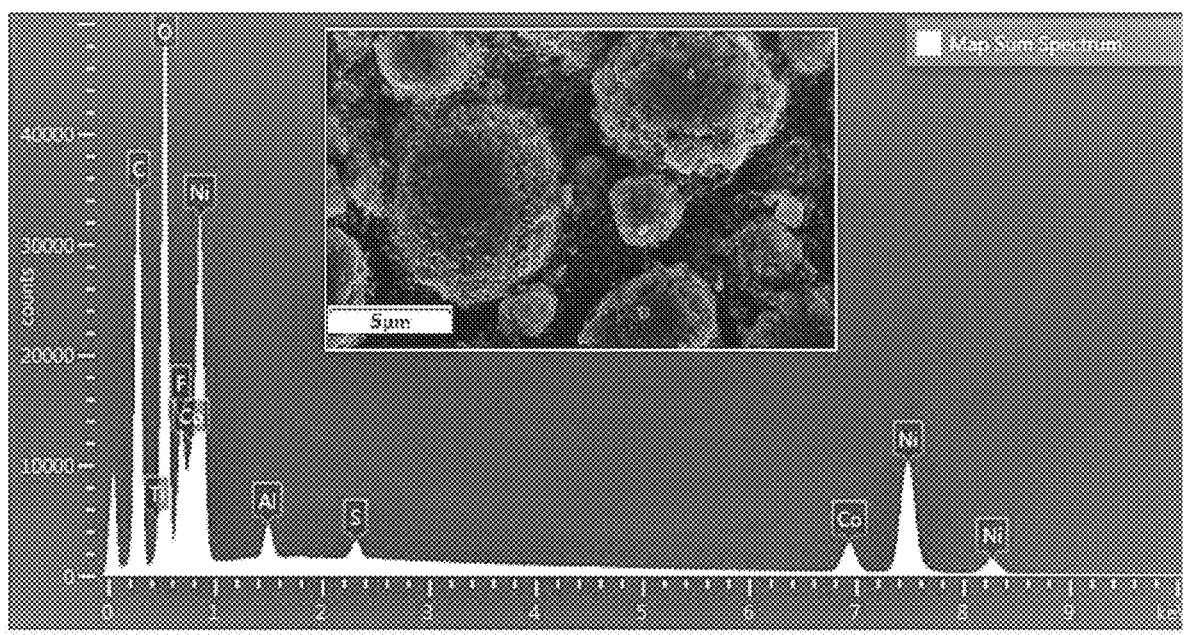

FIGS. 4A and 4B demonstrates the successful coating of 2-Thienyllithium on a cathode via EDS/SEM. There is no signal for sulfur in the control sample (FIG. 4A) while the 2-Thienyllithium treated cathode (FIG. 4B) shows a strong signal for sulfur. Also, the morphology and EDX signal between the control (top) and the 2-Thienyllithium treated cathode (FIG. 2B) are significantly different. The Ir (sample was sputtered with 3 nm of Ir to prevent charging defect while using SEM) are present in both samples, acting as baseline and control to confirm the differences are accurate. The presence of sulfur signal in the 2-Thienyllithium treated cathode indicates that the 2-Thienyllithium or its reactant with NCA cathode are coated on the surface of the cathode.

Figure 5:
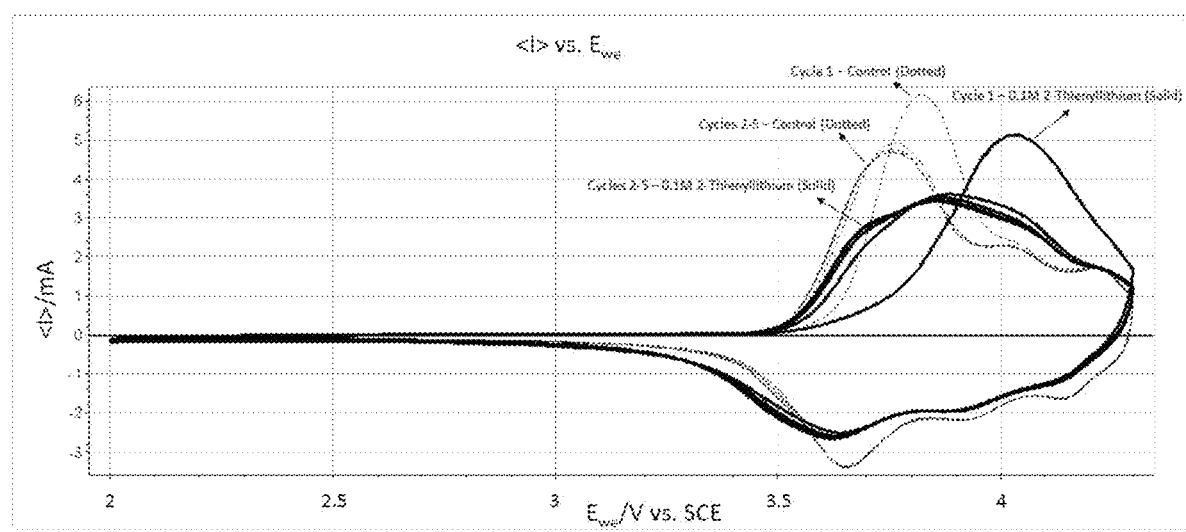
FIG. 5 shows Cyclic voltammetry (CV) curves of NCA cathode-based half type coin cells with 0.1 M 2-Thienyllithium treatment, in accordance with an example embodiment of the disclosure.

FIG. 5 shows cyclic voltammetry (CV) curves of NCA cathode-based half type coin cells. The cathodes used may be: (dotted line)—NCA Control; (solid line)—0.1 M 2-Thienyllithium solution treated NCA. The electrolyte formulation used may be 1.2 M $LiPF_6$ in FEC/EMC (3/7 wt %). The control cathodes contain about 92 wt % NCA, 4 wt % Super P and 4 wt % PVDF5130, and may be coated on 15 μm Al foil. The average loading may be about 20-30 mg/cm$^2$. The 0.1 M 2-Thienyllithium solution treated NCA cathodes may have the same formulations. The CV measurements may be carried out in the voltage range of 2-4.3 V at a scan rate of 0.1 mV s$^{-1}$ using VMP3 equipment.

FIG. 5 demonstrates that a clear oxidation peak appears at ~3.85 V (vs. Li/Li+) for the cell with NCA cathode (control) in the initial charge. This peak shifts to 4.05 V (vs. Li/Li+) for the cell of 0.1 M 2-Thienyllithium solution treated NCA cathode in the initial charge. In the following scanning cycles, the oxidation peak related voltage for NCA control cathode-based cells shifts to ~3.75 V (vs. Li/Li$^+$); while the cell of 0.1 M 2-Thienyllithium solution treated NCA cathode becomes wide with the center at around 3.75V. In addition, with further scanning, there is an extra shoulder at around 3.7 V. These results may indicate that 0.1 M 2-Thienyllithium solution treated NCA cathode has increased polarization and overpotential. At the same time, these treatments may help form a protective layer on the surface of NCA cathodes which changes the surface chemistry of the cathode, leading to different peak position and areas compared with the control.

Figure 6A:
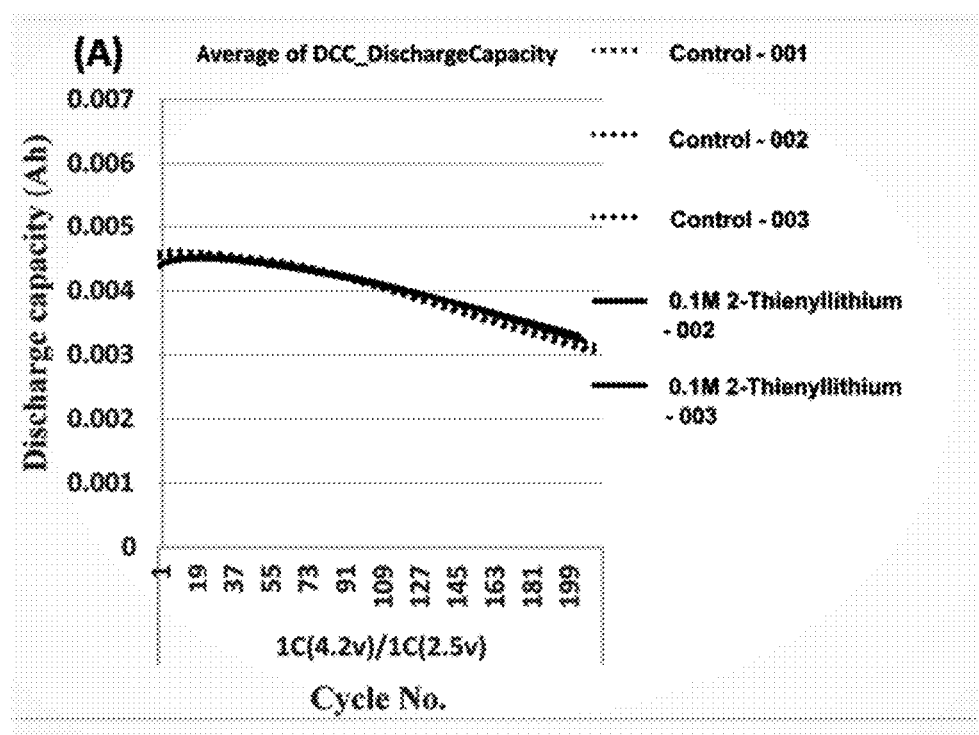
FIGS. 6A and 6B demonstrate Capacity retention (FIG. 6A) and Normalized capacity retention (FIG. 6B) of Si-dominant anode//NCA cathode coin full cells with 0.1 M 2-Thienyllithium treatment. The cathodes used may be: (dotted line)—NCA Control, (solid line)—0.1 M 2-Thienyllithium solution treated NCA, in accordance with an example embodiment of the disclosure.
Figure 6B:
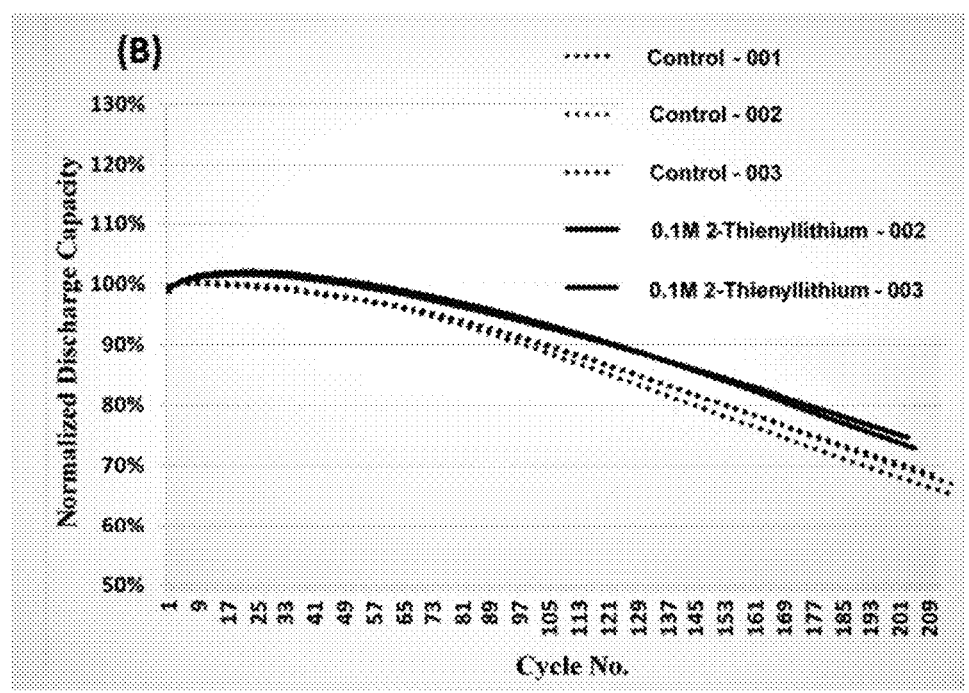

FIGS. 6A and 6B demonstrates the capacity retention (FIG. 6A) and normalized capacity retention (FIG. 6B) of Si-dominant anode//NCA cathode coin full cells. The cathodes used may be: (dotted line)—NCA Control; (solid line)—0.1M 2-Thienyllithium solution treated NCA. The Si-dominant anodes contain about 80 wt % Si, 5 wt % graphite and 15 wt % glassy carbon (from resin) and may be laminated on 15 μm Cu foil. The average loading may be about 2-5 mg/cm$^2$. The control cathodes contain about 92 wt % NCA, 4 wt % Super P and 4 wt % PVDF5130, and may be coated on 15 μm Al foil. The average loading may be about 20-30 mg/cm$^2$. The 0.1M 2-Thienyllithium solution treated NCA cathodes may have the same formulation. The cells may be tested at 25° C.

The long-term cycling program includes: From the 1st cycle, Charge at 1 C to 4.2 V until 0.05 C, discharge at 1 C to 2.5 V, rest 10 minutes.

As demonstrated by the data in FIGS. 6A and 6B, 0.1 M 2-Thienyllithium solution treated NCA cathode-based coin full cells have better cycle performance than the control.

Figure 7:
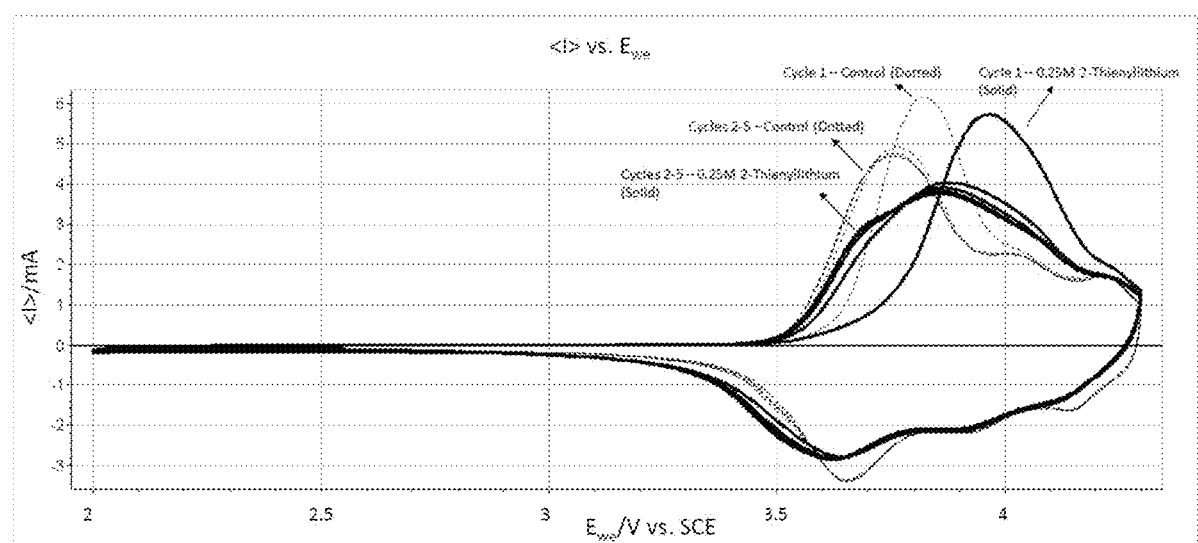
FIG. 7 shows Cyclic voltammetry (CV) curves of NCA cathode-based half type coin cells with 0.25M 2-Thienyllithium treatment, in accordance with an example embodiment of the disclosure.

FIG. 7 shows cyclic voltammetry (CV) curves of NCA cathode-based half type coin cells. The cathodes used may be: (dotted line)—NCA Control; (solid line)—0.25M 2-Thienyllithium solution treated NCA. The electrolyte formulation used may be 1.2 M LiPF6 in FEC/EMC (3/7 wt %). The control cathodes contain about 92 wt % NCA, 4 wt % Super P and 4 wt % PVDF5130, and may be coated on 15 μm Al foil. The average loading may be about 20-30 mg/cm$^2$. The 0.25M 2-Thienyllithium solution treated NCA cathodes may have the same formulations. The CV measurements may be carried out in the voltage range of 2-4.3 V at a scan rate of 0.1 mV s$^{-1}$ using VMP3 equipment.

FIG. 7 demonstrates that a clear oxidation peak appears at ~3.85 V (vs. Li/Li+) for the cell with NCA cathode (control) in the initial charge. This peak shifts to 3.95 V (vs. Li/Li+) for the cell of 0.25M 2-Thienyllithium solution treated NCA cathode in the initial charge. In the following scanning cycles, the oxidation peak related voltage for the control NCA control cathode-based cells shifts to ~ 3.75 V (vs. Li/Li$^+$); while the cell of 0.25M 2-Thienyllithium solution treated NCA cathode becomes wide with the center at around 3.75V. In addition, with further scanning, there is an extra shoulder at around 3.7 V. These results may indicate that 0.25M 2-Thienyllithium solution treated NCA cathode has increased polarization and overpotential. At the same time, these treatments may help form a protective layer on the surface of NCA cathodes which changes the surface chemistry of the cathode, leading to different peak position and areas compared with the control.

Figure 8A:
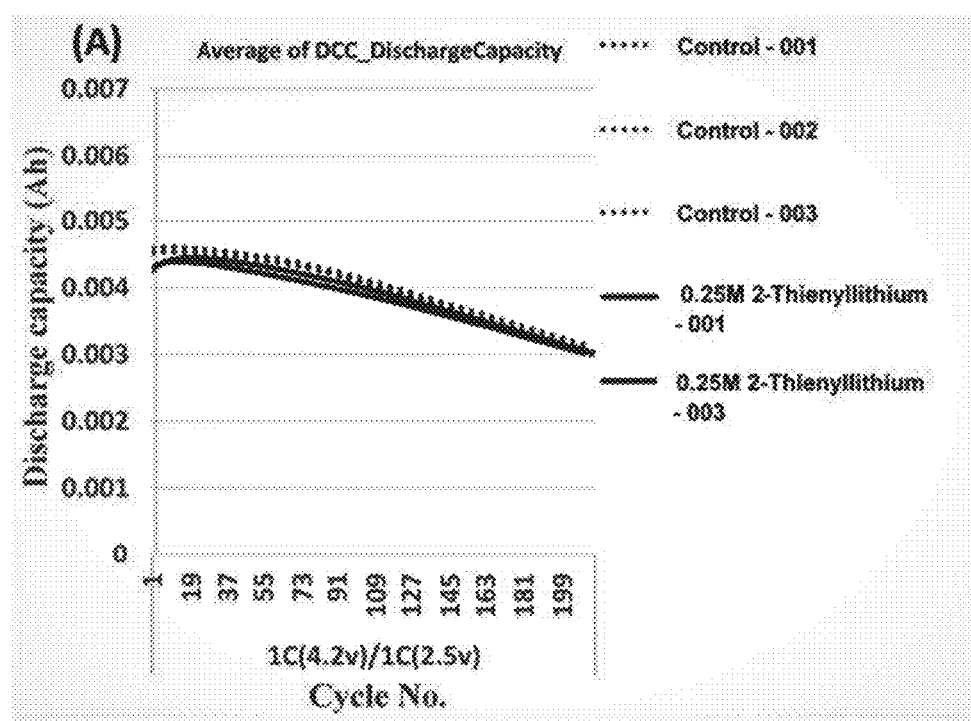
FIGS. 8A and 8B demonstrate Capacity retention (FIG. 8A) and Normalized capacity retention (FIG. 8B) of Si-dominant anode//NCA cathode coin full cells. The cathodes may be: (dotted line)—NCA Control, (solid line)—0.25M 2-Thienyllithium solution treated NCA, in accordance with an example embodiment of the disclosure.
Figure 8B:
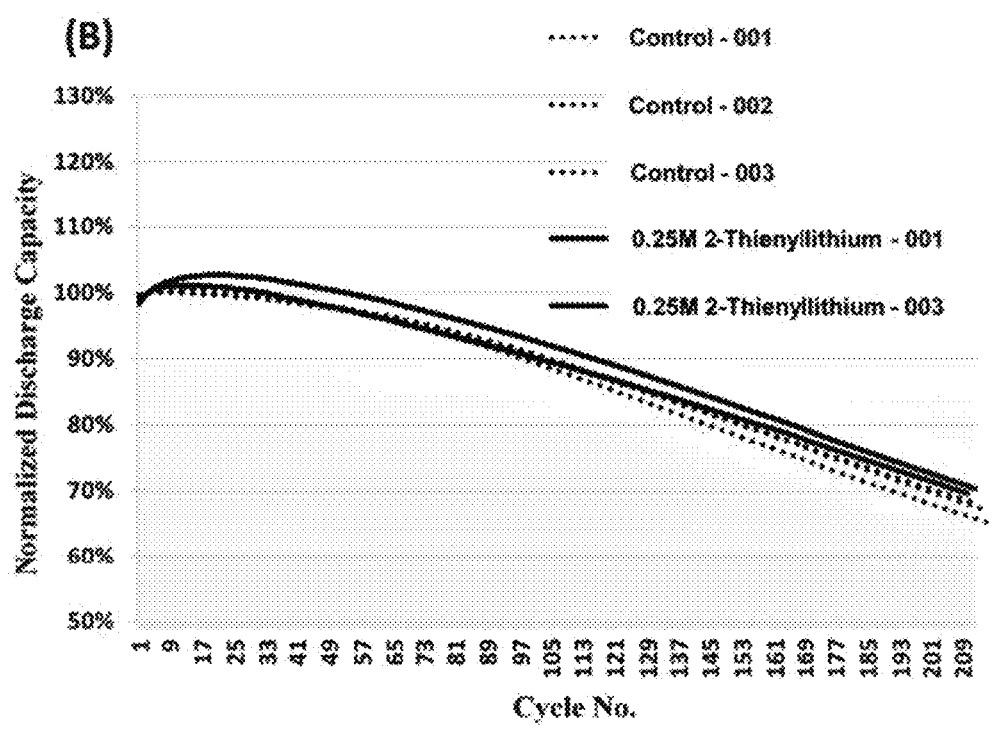

FIGS. 8A and 8B demonstrate the capacity retention (FIG. 8A) and normalized capacity retention (FIG. 8B) of Si-dominant anode//NCA cathode coin full cells. The cathode used may be: (dotted line)—NCA Control; (solid line)—0.25M 2-Thienyllithium solution treated NCA. The Si-dominant anodes contain about 85 wt % Si, 5 wt % graphite and 10 wt % glassy carbon (from resin) and may be laminated on 15 μm Cu foil. The average loading may be about 2-5 mg/cm$^2$. The control cathodes contain about 92 wt % NCA, 4 wt % Super P and 4 wt % PVDF5130, and may be coated on 15 μm Al foil. The average loading may be about 20-30 mg/cm$^2$. The 0.25M 2-Thienyllithium solution treated NCA cathodes have the same formulations. The cells may be tested at 25° C.

The long-term cycling programs are the same as shown in FIG. 4 above.

As demonstrated by the data in FIGS. 8A and 8B, 0.25M 2-Thienyllithium solution treated NCA cathode-based coin full cells have better cycle performance than the control.

Figure 9:
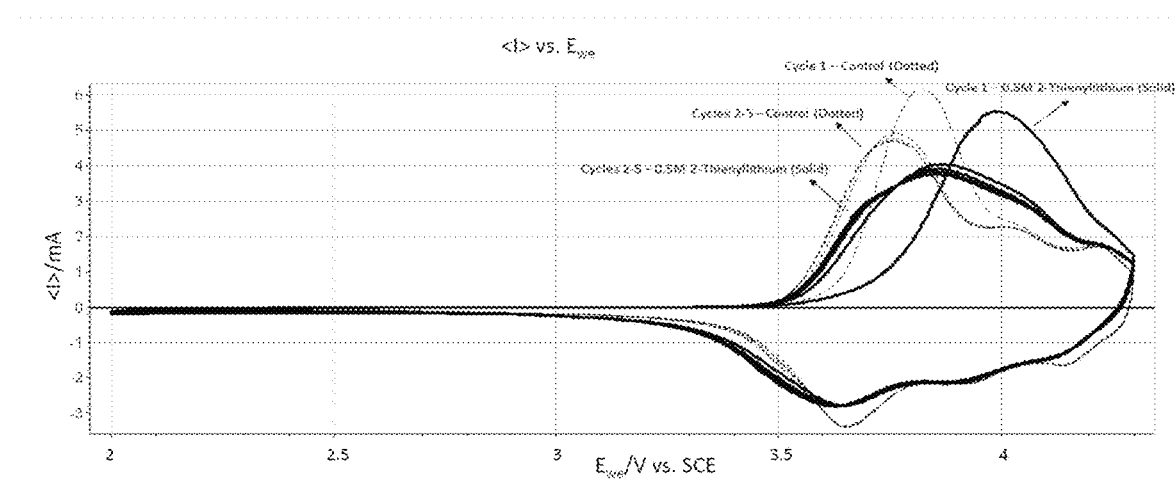
FIG. 9 shows Cyclic voltammetry (CV) curves of NCA cathode-based half type coin cells with 0.5M 2-Thienyllithium treatment, in accordance with an example embodiment of the disclosure.

FIG. 9 shows cyclic voltammetry (CV) curves of NCA cathode-based half type coin cells. The cathodes used may be: (dotted line)—NCA Control, (solid line)—0.5M 2-Thienyllithium solution treated NCA. The electrolyte formulation used may be 1.2 M LiPF6 in FEC/EMC (3/7 wt %). The control cathodes contain about 92 wt % NCA, 4 wt % Super P and 4 wt % PVDF5130, and may be coated on 15 μm Al foil. The average loading may be about 20-30 mg/cm$^2$. The 0.5M 2-Thienyllithium solution treated NCA cathodes may have the same formulations. The CV measurements may be carried out in the voltage range of 2-4.3 V at a scan rate of 0.1 mV s$^{-1}$ using VMP3 equipment.

FIG. 9 demonstrates that a clear oxidation peak appears at ~ 3.85 V (vs. Li/Li+) for the cell with NCA cathode (control) in the initial charge. This peak shifts to 4.0 V (vs. Li/Li+) for the cell of 0.5M 2-Thienyllithium solution treated NCA cathode in the initial charge. In the following scanning cycles, the oxidation peak related voltage for the control NCA control cathode-based cells shifts to ~ 3.75 V (vs. Li/Li+); while the cell of 0.5M 2-Thienyllithium solution treated NCA cathode becomes wide with the center at around 3.75V. In addition, with further scanning, there is an extra shoulder at around 3.7 V. These results may indicate that 0.5M 2-Thienyllithium solution treated NCA cathode has increased polarization and overpotential. At the same time, these treatments may help form a protective layer on the surface of NCA cathodes which changes to the surface chemistry of the cathode, leading to different peak position and areas compared with the control.

Figure 10A:
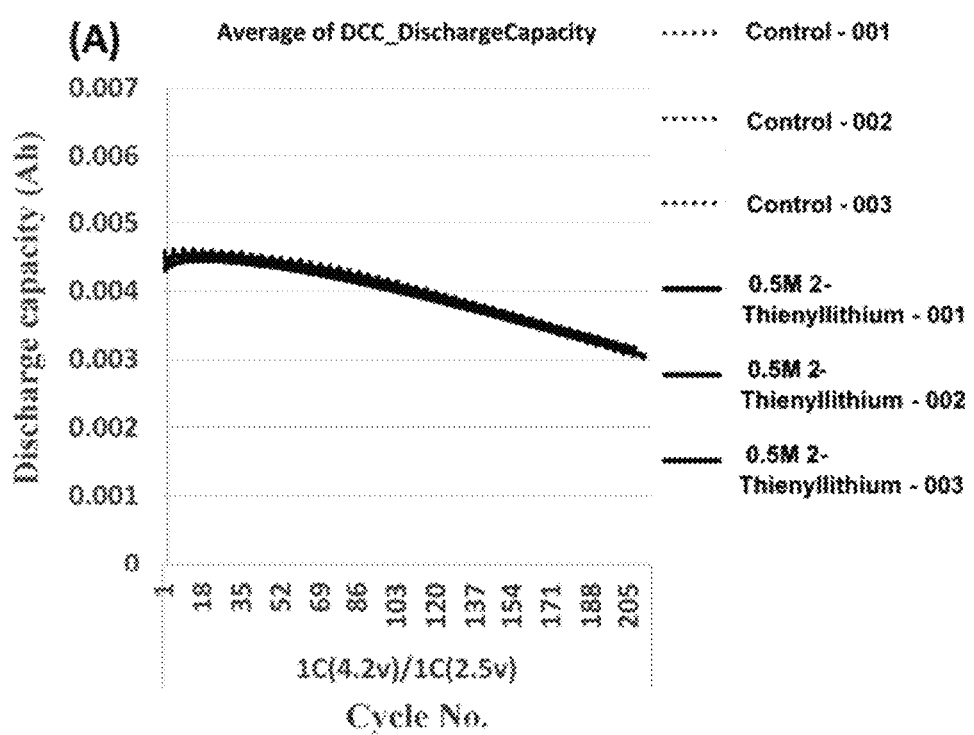
FIGS. 10A and 10B demonstrate Capacity retention (FIG. 10A) and Normalized capacity retention (FIG. 10B) of Si-dominant anode//NCA cathode coin full cells. The cathodes used may be: (dotted line)—NCA Control, (solid line)—0.5M 2-Thienyllithium solution treated NCA, in accordance with an example embodiment of the disclosure.
Figure 10B:
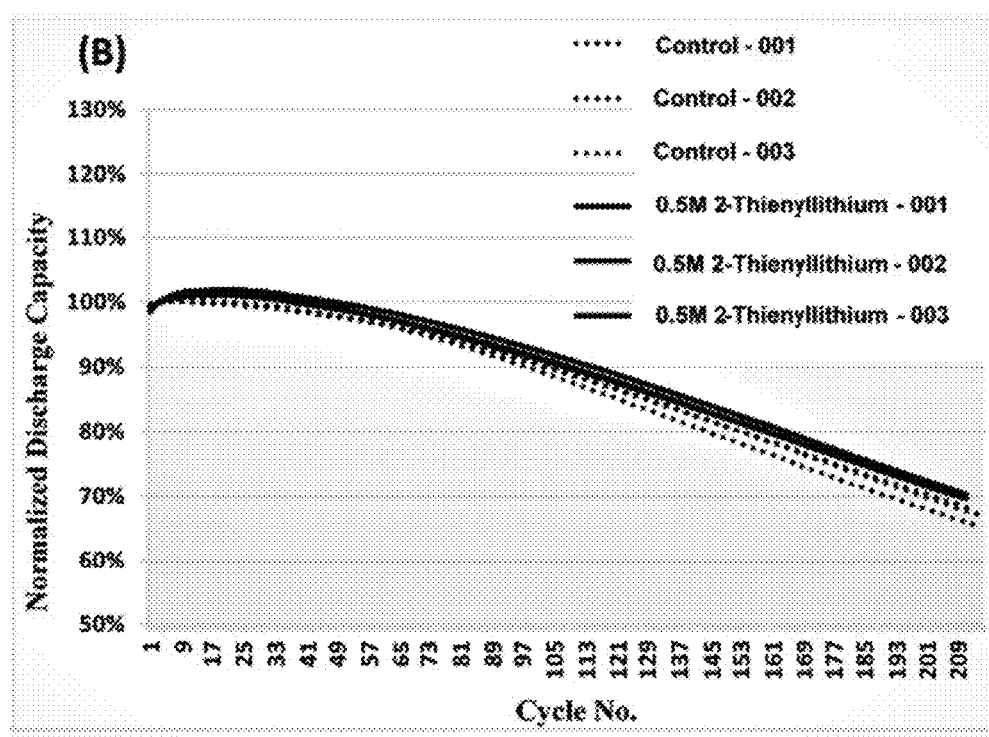

FIGS. 10A and 10B demonstrate the capacity retention (FIG. 10A) and normalized capacity retention (FIG. 10B) of Si-dominant anode//NCA cathode coin full cells. The cathodes used can be: (dotted line)—NCA Control, (solid line)—0.5M 2-Thienyllithium solution treated NCA. The Si-dominant anodes contain about 80 wt % Si, 5 wt % graphite and 15 wt % glassy carbon (from resin) and may be laminated on 10-20 μm Cu foil. The average loading may be about 2-5 mg/cm$^2$. The control cathodes contain about 92 wt % NCA, 4 wt % Super P and 4 wt % PVDF5130, and may be coated on 15 μm Al foil. The average loading may be about 20-30 mg/cm$^2$. The 0.5M 2-Thienyllithium solution treated NCA cathodes have the same formulations. The cells may be tested at 25° C.

The long-term cycling programs are the same as shown in FIG. 4 above.

As demonstrated by the data in FIGS. 10A and 10B, 0.5M 2-Thienyllithium solution treated NCA cathode-based coin full cells have better cycle performance than the control.

Example 2: THF Solvent Treatment

In order to demonstrate that the cell performance increase is due to the functional lithiated agent-containing additives (such as 2-Thienyllithium) a control experiment may be performed. Such an experiment shows that functional lithiated agent-containing additives may react (e.g., be decomposed) on the surface of the electrodes forming an artificial CEI/SEI layer, helping improve the cycle performance, and that such cell performance increase is not due to the THF solvent treatment (since the lithiated agent is in THF/hexanes solvent). In this experiment, the same type of NCA control cathodes used in the previous experiments may be soaked in the THF solvent for more than 24 hours followed by further rinsing with DME. These THF solvent treated cathodes were dried in the same way as shown in the examples above and the corresponding full coin-cells were assembled with a Si-dominant anode, a liquid electrolyte, and a Celgard 2500 Separator. The coin type full cells may be tested using a 1 C/1 C charge/discharge cycle regime with the working voltage window of 4.2V to 2.5V at room temperature and the results are compared with the same control cells as used in FIGS. 6, 8 and 10 where the cathodes were not treated with THF solvent.

Free standing NCA cathode (3 pieces) coated on the surface of Al foil, with a diameter of 12.7 mm and an average loading of about 20-30 mg/cm$^2$ on each side may be immersed in 5 ml of THF for more than 24 hours. The cathodes may be removed from the solvent and washed 2-3 times with pure DME to remove THF solvent. Then cathodes may be dried and the corresponding full coin-cells assembled with a Si-dominant anode, a liquid electrolyte, and a Celgard 2500 Separator. The coin type full cells may be tested using a 1 C/1 C charge/discharge cycle regime with the working voltage window of 4.2V to 2.5V at room temperature.

Figure 11A:
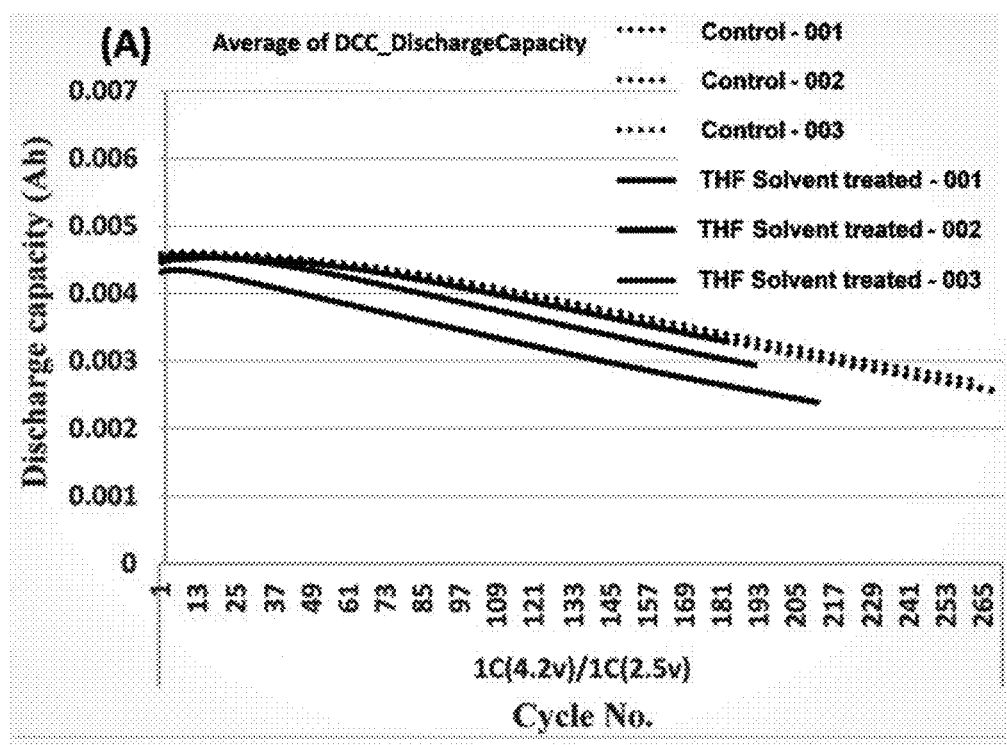
FIGS. 11A and 11B demonstrate Capacity retention (FIG. 11A) and Normalized capacity retention (FIG. 11B) of Si-dominant anode//NCA cathode coin full cells. The cathode used may be: (dotted line)—NCA Control, (solid line)—THF solvent treated NCA, in accordance with an example embodiment of the disclosure.
Figure 11B:
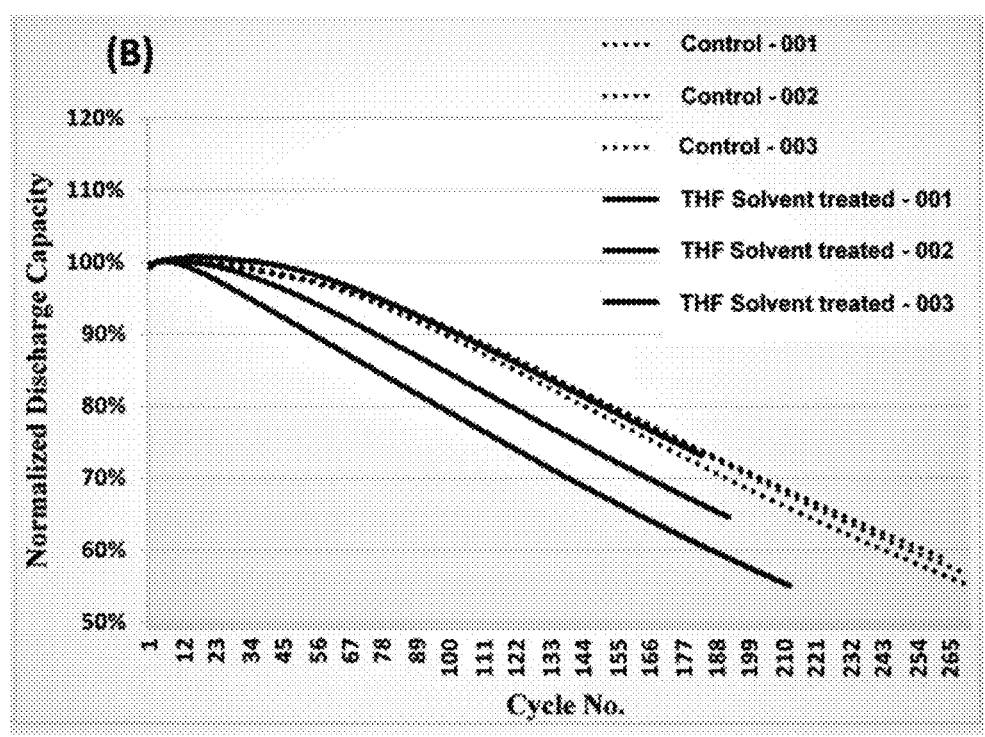

FIGS. 11A and 11B demonstrate the capacity retention (FIG. 11A) and normalized capacity retention (FIG. 11B) of Si-dominant anode//NCA cathode coin full cells. The cathode used may be: (dotted line)—NCA Control, (solid line)—THF solvent treated NCA. The Si-dominant anodes contain about 80 wt % Si, 5 wt % graphite and 15 wt % glassy carbon (from resin) and may be laminated on 15 µm Cu foil. The average loading may be about 2-5 mg/cm$^2$. The control cathodes contain about 92 wt % NCA, 4 wt % Super P and 4 wt % PVDF5130, and may be coated on 15 µm Al foil. The average loading may be about 20-30 mg/cm$^2$. The THF solvent treated NCA cathodes have the same formulations. The cells may be tested at 25° C.

The long-term cycling programs are the same as shown in FIG. 4 above.

FIGS. 11A and 11B indicate the THF treated NCA cathode-based coin full cells have similar cycle performance with the control. This results further prove that THF solvent treatment alone does not improve the cell performance. The improved cycle performance in FIGS. 6, 8 and 10 is due to the 2-Thienyllithium which may be reacted (e.g. decomposed) on the surface of the cathodes, forming an artificial CEI layer, which helps improve the cycle performance.

Example 3: 2-Thienyllithium (Anode)

Free standing silicon anodes (3 pieces), laminated on copper foil, with a diameter of 15 mm and an average loading of about 2-5 mg/cm$^2$ on each side may be immersed in 5 ml of 0.1M, 0.25M or 0.5M 2-Thienyllithium solution in THF/hexanes for more than 24 hours. The anodes may be removed from the solution and washed 2-3 times with pure DME to remove the non-reacted 2-Thienyllithium and other contaminants. Then anodes may be dried and the corresponding full coin-cells assembled with an NCA cathode, a liquid electrolyte, and a Celgard 2500 Separator. The coin type full cells may be tested using a 1 C/1 C charge/discharge cycle regime with a working voltage window of 4.2V to 2.5V at room temperature. The Si-dominant anodes contain about 85 wt % Si, 5 wt % graphite and 10 wt % glassy carbon (from resin) and may be laminated on 15 µm Cu foil.

Example 4: Lithium Diisopropylamide (LDA) (Anode)

Free standing silicon anodes (3 pieces), laminated on copper foil, with a diameter of 15 mm and an average loading of about 2-5 mg/cm$^2$ on each side may be immersed in 5 ml of 0.25M or 0.5M Lithium diisopropylamide (LDA) solution in THF/hexanes for more than 24 hours. The anodes may be removed from the solution and washed 2-3 times with pure DME to remove the non-reacted LDA and other contaminants. Then anodes may be dried and the corresponding full coin-cells assembled with an NCA cathode, a liquid electrolyte, and a Celgard 2500 Separator. The coin type full cells may be tested using a 1 C/1 C charge/discharge cycle regime with the working voltage window of 4.2V to 2.5V at room temperature. The Si-dominant anodes contain about 85 wt % Si, 5 wt % graphite and 10 wt % glassy carbon (from resin) and may be laminated on 15 µm Cu foil.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "Example" means serving as a non-limiting example, instance, or illustration. As utilized herein, the terms "e.g.," and "for example" set off lists of one or more non-limiting examples, instances, or illustrations. As utilized herein, a battery, circuitry or a device is "operable" to perform a function whenever the battery, circuitry or device comprises the necessary hardware and code (if any is necessary) or other elements to perform the function, regardless of whether performance of the function is disabled or not enabled (e.g., by a user-configurable setting, factory trim, configuration, etc.).

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:

1. A battery, the battery comprising:
a silicon-based anode, an electrolyte, and a cathode, wherein the cathode comprises an active material and a lithiated agent-containing additive;
wherein the lithiated agent-containing additive comprises one or more of: (Trimethylsilyl)methyllithium; Lithium bis(diphenylphosphino)methanide; 2-Thienyllithium; 3-Thienyllithium; Lithium;1 H-dibenzothiophen-1-ide;

lithium;2H-1-benzothiophen-2-ide; Lithium cyclopentadienide; lithium;5-tert-butylcyclopenta-1,3-diene; Lithium tetramethylcyclopentadienide; Lithium pentamethylcyclopentadienide; Lithium 1 H-pyrrol-2-ide; Lithium 1-methyl-1 H-pyrrol-2-ide; 2-Furyllithium; (5-Methyl-2-furyl)lithium; lithium;2H-furan-2-id-5-yl (trimethyl)silane; lithium,tert-butyl-(3H-inden-3-id-4-yloxy)-diphenylsilane; lithium,tert-butyl 2H-pyrrol-2-ide-1-carboxylate; lithium,tert-butyl-dimethyl-(2-methylbut-3-yn-2-yloxy)silane; lithium,tert-butyl-dimethyl-pent-4-ynoxysilane; lithium,tert-butyl-but-3-ynoxy-dimethylsilane; lithium,tert-butyl-ethynoxy-dimethylsilane; Lithium phenylacetylide; Lithium (trimethylsilyl)acetylide; lithium tert-butyl amide; Lithium diisopropylamide; lithium tetramethylpiperidide; lithium dicyclohexylamide; Lithium pyrrol-1-ide; lithium;3,3a,4,5-tetrahydro-2H-pyrrolo[2,3-b]pyrrol-1-ide; lithium,tert-butyl(diphenyl)silanide; lithium,bis(methylsulfanyl)methyl-tert-butyl-dimethylsilane; lithium,tert-butyl-phenyl-trimethylsilyloxysilanide; lithium,tert-butyl-phenyl-trimethylsilylsilanide; lithium,trimethyl(prop-2-enyl)silane; Lithium trihydro-1-pyrrolidinylborate; lithium tetramethylborate(1-); lithium hydrotriisobutylborate(1-); lithium dimethyldiphenylborate(1-); Lithium triisobutylhydroborate; lithium bis(tert-butyl)phosphide; Lithium diphenylphosphanide; Lithium tert-butoxide; lithium tert-butyl peroxide; or Lithium aluminium di-n-butylamide, wherein the lithiated agent-containing additive comprises from 10% to 0.5% by weight of the active material.

2. The battery according to claim 1, wherein the cathode active material comprises one or more of: nickel cobalt aluminum oxide (NCA), nickel cobalt manganese oxide (NCM), lithium iron phosphate (LFP), lithium cobalt oxide (LCO), lithium manganese oxide (LMO), Ni-rich layered oxides ($LiNi_{1-x}M_xO_2$, M=Co, Mn, and Al), Li-rich, $xLi_2MnO_3 \cdot (1-x)LiNi_aCo_bMn_cO_2$, Li-rich layered oxides ($LiNi_{1-x}M_{1-x}O_2$, M=Co, Mn, and Ni), or high-voltage spinel oxides ($LiNi_{0.5}Mn_{1.5}O_4$).

3. The battery according to claim 1, wherein the anode comprises an active material that comprises between 50% to 95% silicon by weight.

4. The battery according to claim 1, wherein the battery comprises a lithium ion battery.

5. The battery according to claim 1, wherein the electrolyte comprises a liquid, solid, or gel.

6. A method of forming a battery, the method comprising: forming a battery comprising a silicon-based anode, an electrolyte, and a cathode, wherein the cathode comprises an active material and a lithiated agent-containing additive;

wherein the lithiated agent-containing additive comprises one or more of: (Trimethylsilyl)methyllithium; Lithium bis(diphenylphosphino)methanide; 2-Thienyllithium; 3-Thienyllithium; Lithium;1 H-dibenzothiophen-1-ide; lithium;2H-1-benzothiophen-2-ide; Lithium cyclopentadienide; lithium;5-tert-butylcyclopenta-1,3-diene; Lithium tetramethylcyclopentadienide; Lithium pentamethylcyclopentadienide; Lithium 1 H-pyrrol-2-ide; Lithium 1-methyl-1 H-pyrrol-2-ide; 2-Furyllithium; (5-Methyl-2-furyl)lithium; lithium;2H-furan-2-id-5-yl (trimethyl)silane; lithium,tert-butyl-(3H-inden-3-id-4-yloxy)-diphenylsilane; lithium,tert-butyl 2H-pyrrol-2-ide-1-carboxylate; lithium,tert-butyl-dimethyl-(2-methylbut-3-yn-2-yloxy)silane; lithium,tert-butyl-dimethyl-pent-4-ynoxysilane; lithium,tert-butyl-but-3-ynoxy-dimethylsilane; lithium,tert-butyl-ethynoxy-dimethylsilane; Lithium phenylacetylide; Lithium (trimethylsilyl)acetylide; lithium tert-butyl amide; Lithium diisopropylamide; lithium tetramethylpiperidide; lithium dicyclohexylamide; Lithium pyrrol-1-ide; lithium;3,3a,4,5-tetrahydro-2H-pyrrolo[2,3-b]pyrrol-1-ide; lithium,tert-butyl(diphenyl)silanide; lithium,bis(methylsulfanyl)methyl-tert-butyl-dimethylsilane; lithium,tert-butyl-phenyl-trimethylsilyloxysilanide; lithium,tert-butyl-phenyl-trimethylsilylsilanide; lithium,trimethyl(prop-2-enyl)silane; Lithium trihydro-1-pyrrolidinylborate; lithium tetramethylborate(1-); lithium hydrotriisobutylborate(1-); lithium dimethyldiphenylborate(1-); Lithium triisobutylhydroborate; lithium bis(tert-butyl)phosphide; Lithium diphenylphosphanide; Lithium tert-butoxide; lithium tert-butyl peroxide; or Lithium aluminium di-n-butylamide, wherein the lithiated agent-containing additive comprises from 10% to 0.5% by weight of the active material.

7. The method according to claim 6, wherein the cathode active material comprises one or more of: nickel cobalt aluminum oxide (NCA), nickel cobalt manganese oxide (NCM), lithium iron phosphate (LFP), lithium cobalt oxide (LCO), lithium manganese oxide (LMO), Ni-rich layered oxides ($LiNi_{1-x}M_xO_2$, M=Co, Mn, and Al), Li-rich, $xLi_2MnO_3 \cdot (1-x)LiNi_aCo_bMn_cO_2$, Li-rich layered oxides ($LiNi_{1-x}M_{1-x}O_2$, M=Co, Mn, and Ni), or high-voltage spinel oxides ($LiNi_{0.5}Mn_{1.5}O_4$).

8. The method according to claim 6, wherein the anode comprises an active material that comprises between 50% to 95% silicon by weight.

9. The method according to claim 6, wherein the battery comprises a lithium ion battery.

10. The method according to claim 6, wherein the electrolyte comprises a liquid, solid, or gel.

* * * * *